United States Patent [19]

Terral

[11] Patent Number: 5,421,241

[45] Date of Patent: Jun. 6, 1995

[54] GAS LIFT BELLOWS CONSTRUCTION AND PROCESS FOR MANUFACTURE THEREOF

[75] Inventor: Ben D. Terral, Huntsville, Tex.

[73] Assignee: Enterra Petroleum Equipment Group, Huntsville, Tex.

[21] Appl. No.: 127,437

[22] Filed: Dec. 23, 1993

[51] Int. Cl.⁶ .............................................. F01B 19/00
[52] U.S. Cl. ...................................... 92/42; 92/47; 92/34
[58] Field of Search ................ 92/34, 42, 45, 46, 47

[56] References Cited

U.S. PATENT DOCUMENTS

| | | | |
|---|---|---|---|
| 1,561,065 | 11/1925 | Eggleston | 92/42 |
| 1,661,131 | 2/1928 | Duffield | 92/42 |
| 2,323,985 | 7/1943 | Fausek et al. | 92/42 |
| 2,482,780 | 9/1949 | Kirby, Jr. | 92/42 |
| 3,530,566 | 9/1970 | McMurry et al. | 92/42 |
| 3,530,770 | 9/1970 | McMurry et al. | 92/42 |

FOREIGN PATENT DOCUMENTS 0080557  7/1981  Japan ..................................... 92/42

*Primary Examiner*—Thomas E. Denion
*Attorney, Agent, or Firm*—Bush, Moseley, Riddle & Jackson

[57] ABSTRACT

A bellows construction is provided which defines multiple convolutions along the length thereof and having the ends of the bellows connected to respective fixed and moveable components by means of high temperature solder or weld metal. To protect the bellows against damage by overpressure, back-up rings are positioned in each of the inwardly and outwardly facing convolutions of the bellows structure. Back-up rings in the heat affected zones at the end portions of the bellows are composed of metal so that they will not become deteriorated by application of heat. Internal back-up rings in the central, non-heat affected zone of the bellows may be composed of a polymer material. All of the back-up rings of the externally facing convolutions of the bellows may be composed of polymer materials since they can be assembled within the respective convolutions. After the soldering or welding operations have been completed. Also, if desired, all of the back-up rings of the inwardly facing convolutions of the bellows may be composed of metal to provide positive assurance against any possibility of back-up ring degradation due to application of heat during soldering or welding operations.

13 Claims, 1 Drawing Sheet

U.S. Patent — June 6, 1995 — 5,421,241
FIG.1
FIG.2
FIG.3
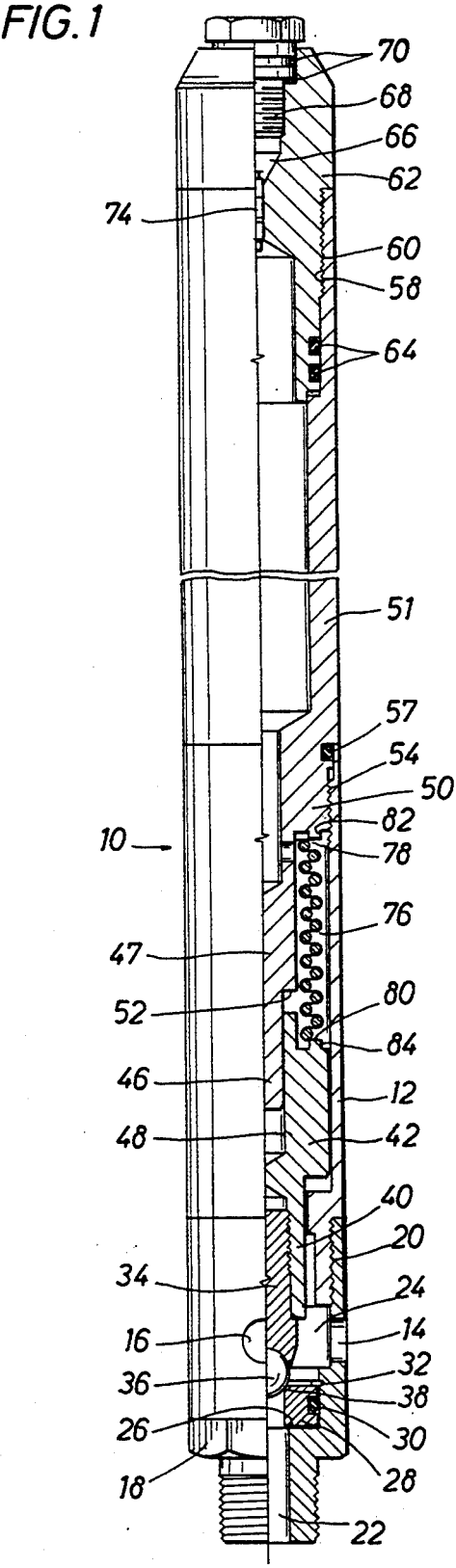
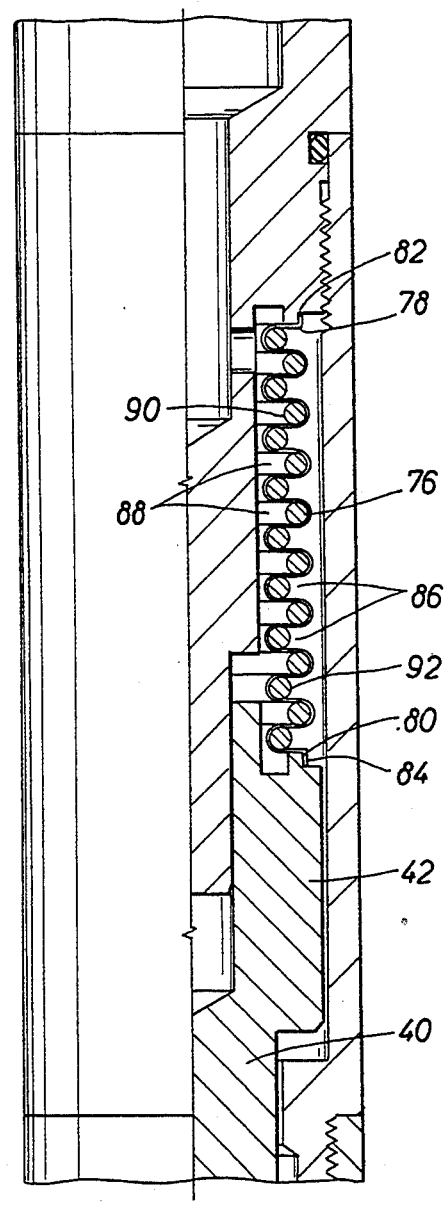
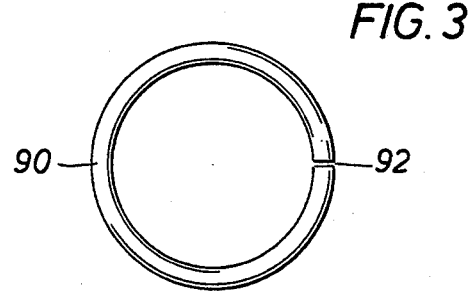

GAS LIFT BELLOWS CONSTRUCTION AND PROCESS FOR MANUFACTURE THEREOF

FIELD OF THE INVENTION

This invention relates generally to gas-lift valves which are utilized in the production tubing of wells for controlled introduction of gas into the tubing for gas-induced upward movement of fluid from a production zone through the production tubing to the surface. More specifically, the present invention relates to a bellows construction for gas-lift valves having support rings in the bellows convolutions which protect the bellows against pressure induced damage in the event of overpressure. Also this invention concerns a method for manufacturing a bellows assembly, including assembly of metal and polymer back-up rings to the bellows convolutions in a manner accommodating high temperature soldering or welding of the bellows ends to mating valve parts.

BACKGROUND OF THE INVENTION

A bellows is a spring-like member which may be used in a great many instruments such as pressure responsive valves. For example, gas-lift valves which are used in the oil and gas industry in the production of oil often include a bellows member such as disclosed by U.S. Pat. Nos. 3,175,154 and 3,530,566 of McMurry Oil Tools, Inc. As used in such valves, the bellows is typically a hollow cylindrical device constructed of a flexible material, typically thin metal, and having plurality of circumferential corrugations in the form of a plurality of inwardly opening convolutions and a plurality of outwardly opening convolutions which are arranged in alternating relation along the axial length of the bellows. The bellows expands and contracts along its longitudinal axis in response to pressure differential, thereby causing expansion and contraction of each of the convolution along the length of the bellows and providing for bellows urged movement of an internal component such as a valve member while the bellows maintains a sealed, pressure containing partition within the valve assembly.

In the past, to solve problems of the bellows becoming weakened along fold lines defined generally by the convolutions as the convolutions are subjected to excessive pressure differential, the bellows construction has been provided with internal and external back-up rings within the convolutions which provide structural support and thus minimize excessive deformation of the bellows. The subject matter of U.S. Pat. No. 2,963,043 of Davis, et al, discloses back-up rings in the form of split rings which are located within the internal bellows convolutions. Generally, however, it has been determined that a more satisfactory bellows construction may be achieved through the provision of shrink fit type polymer back-up rings which are disclosed in U.S. Pat. Nos. 3,530,566 and 3,530,770 of McMurry, et al.

When the typically metal bellows construction is secured at respective ends thereof to corresponding fixed and moveable gas-lift valve components, such attachment is typically accomplished by means of soldering. When this is done, a small end section of the bellows, referred to herein as the heat affected zone, is subject to sufficient heating that the polymer back-up rings of the bellows construction can melt or sublimate to the point that the bellows convolutions may not be provided with proper support, especially at the end portions thereof. According to the McMurry '566 and '770 Patents, identified above, special heat-resistant rings are used for inwardly-facing or opening convolutions adjacent the ends of the bellows where soldering or other heating operations may occur. These heat-resistant back-up rings are intended to withstand the heat of soldering in the heat affected zones without in any way changing the configuration thereof. Typically these heat-resistant back-up rings are composed of asbestos while other back-up rings of the bellows construction are composed of any one of a number of suitable polymer materials such as polytetrafluoroethylene which is sold under the registered trademark, TEFLON.

In more recent times, gas-lift induced production activities are being accomplished at deeper production zones where greater gas pressures and hydrostatic pressures are likely to be encountered. Thus, the bellows construction of gas-lift valves must be more resistent to higher pressure differentials than in the past. The respective ends of the bellows, to withstand high pressure differentials, may be connected and sealed to the respective fixed and moveable internal valve components by means of high temperature solder or by welding operations wherein substantially greater heat is applied to the ends of the bellows than in the past, thereby causing the heat effective zones of the bellows to be significantly larger. In the event polymer back-up rings are employed in the bellows convolutions, a significantly greater number of them would be typically damaged by the heat of high temperature soldering or welding. When this happens the bellows convolutions will not be properly supported and pressure induced damage can occur. It is desirable, therefore, to provide a suitable construction and method of manufacturing for the bellows assembly of gas-lift valves to permit high temperature soldering or welding without consequent heat induced damage to the back-up rings of the bellows convolutions.

SUMMARY OF THE INVENTION

It is a principle feature of the present invention to provide a novel high differential pressure responsive gas-lift valve assembly incorporating a metal bellows having respective ends thereof joined to internal stationery and moveable valve components by high temperature soldering or welding.

It is another feature of this invention to provide a novel bellows construction having heat affected zones of significant length at each end thereof and wherein internal convolutions in the bellows in the heat affected zones are provided with metal back-up rings of circular cross-sectional configuration, which metal rings are present in the inwardly facing convolutions of the heat affected zones during high temperature soldering or welding of the bellows to respective valve components.

It is another feature of this invention to provide a novel bellows construction for gas-lift valves which employs a combination of metal back-up rings in the internal convolutions of the heat affected zones at each end thereof and employs polymer back-up rings in the central internally facing convolutions and all of the externally opening or facing convolutions of the bellows construction.

It is also an important feature of this invention to provide a novel method for the manufacture of a bellows construction such as for use in gas-lift valves and which provides effectively for positioning of metal back-up rings in the internally opening convolutions in the heat affected zones at each extremity of the bellows which are positioned within the bellows prior to high temperature soldering or welding thereof to respective internal stationery and movable valve components.

It is another feature of this invention to provide a novel method for manufacturing and assembling the bellows construction of a gas-lift valve assembly for high pressure service, wherein metal back-up rings are located within internally opening convolutions of the bellows prior to assembly thereof to respective internal valve components by high temperature soldering or welding and polymer or metallic back-up rings are employed within the central, non-heat affected zone of the bellows construction.

It is an even further feature of this invention to provide a novel gas-lift valve bellows construction which is provided with polymer back-up rings in the externally opening convolutions of the bellows, which are located within the convolutions of the bellows after high temperature soldering or welding operations have been completed to attach respective ends of the bellows to stationery and movable valve components.

Briefly, the various objects and features of the present invention are realized through the provision of a metal generally tubular bellows construction having multiple internally and externally opening convolutions along the length thereof, which bellows is designed for assembly to internal stationery and movable valve components by means of high temperature soldering or welding. Prior to connection of the bellows ends to the mating valve components split metal rings of circular cross-sectional configuration are positioned within the inwardly opening convolutions of the bellows in the heat affected zones at each end thereof. These heat affected zones, because of high temperature soldered or welded connection typically include a plurality of bellows convolutions at each end of the bellows. Consequently, a plurality, two or three or.more metal back-up rings are positioned within the inwardly opening convolutions at each end of the bellows prior to soldering or welding thereof. The convolutions of the non-heat affected zone located centrally of the bellows, and which typically also incorporates a plurality of bellows convolutions may be provided with polymer or metal back-up rings within the inwardly opening convolutions as suits the manufacturing process because they will not become heated to the point of degradation. If desired, all of the inwardly opening convolutions of the elongate bellows construction may be provided with metal internal back-up rings. After the internal back-up rings have been placed within the inwardly opening bellows convolutions the respective ends of the bellows may be soldered or welded to the respective stationery and moveable components without any heat influenced degradation of the internal back-up rings. After the respective ends of the bellows have been soldered or welded to the valve components a plurality of polymer back-up rings are then positioned within the outwardly opening bellows convolutions. These polymer back-up rings are typically positioned at the respective bellows convolutions and are shrunk to fit by application of pre-determined heat thereto. After all of the polymer back-up rings have been properly seated within the externally opening convolutions of the bellows, the other components of the gas-lift valve construction may then be assembled to complete the manufacturing operation.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

FIG. 1 is a half-sectional view of a gas-lift valve mechanism which incorporates a bellows assembly that is constructed in accordance with the teachings of the present invention.

FIG. 2 is a fragmentary sectional view of the gas-lift valve mechanism of FIG. 1, illustrating the bellows assembly of FIG. 1 in greater detail.

FIG. 3 is an elevational view of a metal back-up ring which is located within the inwardly opening convolutions of the bellows.

DETAILED DESCRIPTION OF PREFERRED EMBODIMENT

Referring now to the drawings and first to FIG. 1, a gas-lift valve is illustrated generally at 10 having an elongate generally tubular housing 12. In its operating position, the valve may be positioned adjacent the tubing string in a well, in the annulus between the tubing and the well casing. The housing 2 contains suitable openings, such as those illustrated at 14 and 16 for fluid communication between the annulus and the interior of the housing 12. A tubular coupling element 18 is seen to be threadily connected to the housing 12 at its lower extremity by means of a threaded connection 20. The coupling element 18 defines a central bore 22, through which gas is injected into the tubing string through the internal valve chamber 24. The coupling element 18 further has an interior enlargement 26, defining a seat receptacle within which is received a seat assembly 28 which is sealed by means of an O-Ring seal 30 and which is secured in position by a retainer ring 32.

Flow from the annulus through the valve and into the tubing string via the bore 22 is controlled by a bellows operated valve member carriage 34 having a valve head 36 which is positionable for a sealing engagement with a circular valve seat 38 defined by the seat assembly 28. The valve carriage 34 is connected to the tubular carriage stem 40 of a bellows fitting 42 which constitutes a movable valve component guide receptacle 48 is defined in the movable fitting 50 and receives the lower guide pin 46 of a fixed internal valve element 47 which is integrally connected to an intermediate housing coupling section 50 of an upper housing sub 51. The fixed internal valve element 47 defines a downwardly directed shoulder 52 serving as a stop shoulder for limiting upward movement of the movable valve element 42 and thus the valve carriage 34. The upper end of the housing section 12 is secured to the coupling element 50 by means of a threaded connection 54 and is sealed thereto by a circular housing seal 57.

The housing sub 51 is provided with an internally threaded upper extremity 58 within which is received the externally threaded lower portion 60 of a closure plug 62. The closure plug is sealed with respect to the housing sub 51 by means of annular sealing elements 64 which are carried within suitable annular seal recesses in the closure plug. The closure plug also defines an internal receptacle 66 which receives a screw fitting 68 having, external seals 70 for establishment for a positive seal with the closure plug. The screw fitting, when removed, permits fluid access to a bellows charging passage 72 to permit the introduction of a pressurized gaseous medium which is introduced through a check valve assembly 74. The screw fitting 68 in fact, functions as a double seal to prevent any pressure leakage from within the bellows in the event some leakage of the check valve 74 should occur.

A bellows of elongate tubular form is located between the fitting 42 and the coupling 50 and is positioned about the guide stem 46. Respective upper and lower ends 78 and 80 of the bellows are connected by high-temperature solder or weld metal 82 and 84. The bellows 76 defines a plurality of circumferential convolutions along the length thereof defining outwardly opening or facing convolutions as shown at 86 in FIG. 2 and inwardly opening convolutions as shown at 88. These circumferential corrugations or convolutions permit the bellows to become extended or contracted along its longitudinal axis in response to pressure deferential and thus permits consequent axial movement of the valve carriage structure to thereby adjust the position of the valve head 36 with respect to the valve seat and thereby control admission of gas from the valve chamber 24 into the tubing string through the flow passage 22.

To prevent damage to the bellows structure in the event it should become overpressured, i.e. subjected to excessive pressure deferential each of the inwardly and outwardly opening convolutions are provided with back-up rings to thus provide the bellows with structural support at the convolutions to prevent pressure-induced flattening of the convolutions. The back-up rings are of circular cross-sectional configuration so as to establish surface-to-surface support with the rounded curvature of the convolutions. This surface-to-surface support will prevent creasing of the convolutions in the event high pressure differential should be developed. It is necessary to provide the inwardly opening convolutions with back-up rings prior to soldering or welding of the end portions of the bellows to the mating stationery and movable valve components. Since during high temperature soldering or welding heat affected zones will be developed so that a plurality of the convolutions become heated to a sufficiently elevated temperature as to melt or degrade polymer back-up rings, a plurality of metal back-up rings are positioned in the inwardly facing convolutions of the heat affected zones prior to the soldering or welding operations. Since the central portion of the bellows structure will not be increased in temperature during soldering or welding sufficiently so that the polymer back-up rings could become degraded by increased temperature, the inwardly opening convolutions of the non-heat affected zone may be provided with size stable polymer back-up rings. In the alternative, all of the inwardly opening convolutions of the bellows including the central non-heat affected zone may be provided with metal back-up rings prior to the soldering or welding operation.

After the back-up rings have been placed within each of the inwardly opening convolutions, the respective end portions 78 and 80 of the bellows will be connected to the respective valve components by high temperature soldering or welding operations. After connection of the bellows to the valve components in this manner and after the bellows has cooled to a suitable temperature polymer back-up rings may be positioned within the outwardly opening convolutions 86 of the bellows structure. These polymer back-up rings may be positioned within the respective convolutions by utilizing any one of a number of suitable shrink type polymers having the capability of being shrunk by application of heat thereto. The metal back-up rings 90 and the polymer back-up rings 92 cooperate to provide the bellows structure with efficient support within the convolutions so that the thin metal of the bellows will not become creased in response to application of excessive pressure deferential thereto.

When the bellows construction of the present invention is manufactured according to the methods set forth herein and when metal back-up rings are employed in the inwardly opening convolutions of the bellows in the heat affected zones, the high temperature process for soldered or welded connection of the bellows ends to the respective internal valve components will not cause heat induced degrading of the back-up rings. When constructed in this manner, the bellows will be efficiently supported within all of its convolutions and will effectively withstand high pressure deferential without the development of any pressure induced creases in the metal that might otherwise cause the metal to rupture or become rapidly fatigued to the point of failure. The metal back-up rings 90 within each of the inwardly facing convolutions of the heat affected zones may be of the configuration shown in FIG. 3. As shown, the metal back-up ring 90 is in the form of a split ring composed of wire of circular cross-sectional configuration which is bent to a circular form of proper size to fit the internal dimension of the bellows convolutions. These metal back-up rings will be formed so that the joint 92 thereof is defined by substantially abutting the ends of the circular back-up rings. They may be placed within the inwardly opening convolutions either during manufacture of the metal bellows or after manufacture thereof.

Where polymer back-up rings are employed within the inwardly opening convolutions of the bellows structure, they should be size stable so that they will not shrink upon application of heat; otherwise, they could leave or be extruded from their respective convolutions and could interfere with operation of the bellows construction. More importantly, however, they should remain firmly seated at the curved end walls of the respective convolutions so that they can provide adequate support for the bellows structure at all times.

After the bellows has been assembled in this manner the bellows may be charged with pressure by injecting pressurized gas such as nitrogen through the check valve 94 and through the passage 72 to the inner chamber that is defined by the bellows. In absence of significant pressure deferential this internal pressure will cause linear expansion of the bellows, thereby driving the valve carriage 34 and its valve head 36 into tight sealing engagement with the circular seat 38 of the seat assembly 28. Application of annulus pressure through the housing openings 14 and 16 into the chamber 24 acts externally on the bellows against the internal pressure of the bellows precharge. As the pressure within chamber 24 is increased the pressure deferential across the bellows will lessen and the bellows structure will be axially retracted, thereby causing the valve carriage 34 to be moved upwardly so that the valve head 36 is unseated from the valve seat 38. When this occurs, gas pressure within the chamber 24 will flow past the valve seat and through the passage 22 into the tubing string for production of any liquid that is present in the tubing above the gas-lift valve. If the chamber 24 is subjected to an immediate and significant increase in pressure the bellows will tend to become fully collapsed, causing the convolutions to seat against one another. When this occurs, the back-up rings, located within each of the inwardly and outwardly opening convolutions, provides structural back-up for the convolutions and prevents them from being collapsed to the point that the thin metal of the bellows can develop crease or fold lines. This feature provides adequate protection for the bellows and insures that the service life of the bellows will remain effective for a considerable period of time. Further, the stop shoulder 52 will limit the upward movement of internal valve member 42 and thereby assist in preventing tight axial collapsing of the bellows.

From the foregoing it is apparent that a novel method and apparatus has been provided for the manufacture of metal bellows assemblies for gas-lift valves and other devices which compensates for the high degree of heat that occurs upon high temperature soldering or welding of the bellows ends to the respective internal valve components. It is therefore apparent that this invention is one well adapted to achieve all of the objects and features that have been set forth above. While the invention has been explained in terms of particularly advantageous embodiments, it will be understood by those skilled in the art that various changes may be made in the structures described herein without departing from the scope of the invention which is defined by the following claims.

What is claimed is:

1. A method for manufacturing the bellows assembly of a gas-lift valve mechanism having a housing having stationary and movable internal valve components therein, said method comprising:
   (a) selecting a permanently deformable metallic tubular bellows member having opposed ends and having a plurality of rounded and equal alternate inwardly facing and outwardly facing circumferential convolutions, said metallic tubular bellows member having heat affected zones at each end thereof each incorporating a plurality of said circumferential convolutions having a rounded curvature, said tubular bellows member having a non-heat affected zone centrally thereof incorporating a plurality of said circumferential convolutions, said heat affected zones being adapted for high temperature connection to respective internal stationary and movable internal valve components;
   (b) positioning metal back-up rings of circular cross-sectional configuration in each of said inwardly facing convolutions of said heat affected zones to establish surface-to-surface supported engagement with said rounded curvature of said convolutions;
   (c) positioning polymer back-up rings of circular cross-sectional configuration in each of said inwardly facing convolutions of said non-heat affected zone;
   (d) connecting said opposed ends of said bellows to said internal stationary and movable valve components by application of heat and high temperature molten metal thereto; and
   (e) positioning polymer back-up rings in each of said outwardly facing convolutions of said tubular bellows member after said heat affected zones have cooled.

2. The method of claim 1, wherein said positioning step (c) comprises:
   positioning a metal back-up ring of circular cross-sectional configuration in each of said inwardly facing convolutions of said non-heat affected zone of said tubular bellows member prior to said connecting said opposed ends of said bellows to said internal stationery and movable valve components.

3. The method of claim 1, wherein said positioning step (c) comprises:
   positioning a polymer back-up ring in each of said inwardly facing convolutions of said non-heat affected zone of said tubular bellows member prior to said connecting said opposed ends of said bellows to said internal stationery and movable valve components.

4. The method of claim 1, wherein said step (d) of connecting said opposed ends of said tubular bellows member to said stationary and movable internal valve components comprises:
   applying heat and high temperature solder to the joint defined by assembly of said opposed ends to said stationary and movable internal valve components.

5. The method of claim 1, wherein said step (d) of connecting said opposed ends of said tubular bellows member to said stationary and movable internal valve components comprises:
   applying heat and high temperature weld metal to the joint defined by assembly of said opposed ends to said stationary and movable internal valve components.

6. In a gas-lift valve mechanism having a housing and stationary and movable internal valve components, said movable internal components controlling the flow of gas through said valve mechanism, the improvement comprising:
   (a) a deformable metallic tubular bellows member having opposed ends and having a plurality of equal alternate inwardly facing and outwardly facing circumferential convolutions of rounded cross-sectional configuration, said metallic tubular member defining heat affected zones at each end thereof incorporating a plurality of said circumferential convolutions and defining a non-heat affected zone centrally thereof incorporating a plurality of said circumferential convolutions;
   (b) means connecting one of said opposed ends of said metallic tubular bellows member to said stationary internal valve component and for connecting the other of said opposed ends of said metallic tubular bellows member to said movable internal valve component;
   (c) a plurality of metal back-up rings of circular cross-sectional configuration being located one within each of said inwardly facing circumferential convolutions of said heat affected zones and establishing surface-to-surface supported engagement with said rounded curvature of said convolutions;
   (d) a plurality of back-up rings of circular cross-sectional configuration being located one within each of said inwardly facing circumferential convolutions of said non-heat affected zone; and (e) a plurality of polymer back-up rings of circular cross-sectional configuration being located one within each of said outwardly facing convolutions of said heat affected zones and said non-heat affected zones of said metallic tubular bellows member.

7. The improvement of claim 6, wherein:
said plurality of back-up rings of said non-heat affected zone being metal back-up rings.

8. The improvement of claim 6, wherein:
said plurality of back-up rings of said non-heat affected zone being polymer back-up rings.

9. The improvement of claim 6, wherein:
said metal back-up rings of said heat affected zones and said non-heat affected zone are split metal rings having ends disposed in juxtaposed relation.

10. A gas-lift valve mechanism, comprising:

(a) a housing having stationary and movable internal valve components, said movable internal components being responsive to pressure for controlling the flow of gas through said valve mechanism;

(b) a deformable metallic tubular bellows member having opposed ends and having a plurality of rounded and equal alternate inwardly facing and outwardly facing circumferential convolutions, said metallic tubular member defining heat affected zones at each end thereof incorporating a plurality of said circumferential convolutions and defining a non-heat affected zone centrally thereof incorporating a plurality of said circumferential convolutions of rounded cross-sectional configuration;

(c) heat deposited means connecting one of said opposed ends of said metallic tubular bellows member to said stationary internal valve component and for connecting the other of said opposed ends of said metallic tubular bellows member to said movable internal valve component;

(d) a plurality of metal back-up rings of circular cross-sectional configuration being located one within each of said inwardly facing circumferential convolutions of said heat affected zones and establishing surface-to-surface supported engagement with said rounded curvature of said convolutions;

(e) a plurality of metal back-up rings of circular cross-sectional configuration being located one within each of said inwardly facing circumferential convolutions of said non-heat affected zone; and (f) a plurality of polymer back-up rings of circular cross-sectional configuration being located one within each of said outwardly facing convolutions of said heat affected zones and said non-heat affected zones of said metallic tubular bellows member.

11. The improvement of claim 10, wherein:
said plurality of back-up rings of said non-heat affected zone being metal back-up rings.

12. The improvement of claim 10, wherein:
said plurality of back-up rings of said non-heat affected zone being polymer back-up rings.

13. The improvement of claim 10, wherein:
said metal back-up rings of said heat affected zones and said non-heat affected zone are split metal rings having ends disposed in juxtaposed relation.

* * * * *